April 28, 1959 J. OPPENHEIMER 2,883,902

PROMPTING APPARATUS

Filed Oct. 14, 1954 5 Sheets-Sheet 1

INVENTOR.
JESS OPPENHEIMER

BY J. Fonstool [signature]
ATT'Y.

April 28, 1959 J. OPPENHEIMER 2,883,902

PROMPTING APPARATUS

Filed Oct. 14, 1954 5 Sheets-Sheet 2

INVENTOR.
JESS OPPENHEIMER

BY J. Louis Wolk
ATT'Y

April 28, 1959 J. OPPENHEIMER 2,883,902

PROMPTING APPARATUS

Filed Oct. 14, 1954 5 Sheets-Sheet 3

INVENTOR.
JESS OPPENHEIMER

BY J. Comstock
ATT'Y.

INVENTOR.
JESS OPPENHEIMER
BY J. Leventhal
ATT'Y

April 28, 1959 J. OPPENHEIMER 2,883,902

PROMPTING APPARATUS

Filed Oct. 14, 1954 5 Sheets-Sheet 5

INVENTOR.
JESS OPPENHEIMER

BY [signature]
ATT'Y.

United States Patent Office 2,883,902

Patented Apr. 28, 1959

2,883,902

PROMPTING APPARATUS

Jess Oppenheimer, Los Angeles, Calif.

Application October 14, 1954, Serial No. 462,328

8 Claims. (Cl. 88—16)

The present invention relates to a novel apparatus for visual presentation of program or speech material to speakers, actors, and in general to individuals who appear in public or before television or movie cameras. More particularly, the present invention relates to such apparatus utilized in combination or association with television or movie cameras.

In the production of a television program the speaker, actor or performer is viewed by one or more television cameras through which the performance is transmitted. In order to give the impression of spontaneity, the script or text of the material to be delivered must be committed to memory and it is obvious that hesitancy, fumbling, obvious reading of a manuscript, and the like will militate against the creation of the desired impression and impair the performance. In addition, programs must be carefully timed and any delays which occur through faulty memorization or reading of lines may necessitate abrupt interruption of the program when the program time has expired. By the same token, premature termination may be caused by accelerated reading of lines. Similar principles apply in filmed television programs and movie production, even though timing is not necessarily so critical as the production is not "live." Still, muffed lines, poor timing and similar results of faulty memory, etc. can have serious effects on the costs of production through the necessity for repeated shots until the desired degree of perfection is obtained.

The necessity for memorizing long scripts requires the expenditure of considerable time by performers and speakers as well as one or more rehearsals. The elimination or reduction of these requirements would be a distinct advantage in facilitating program and film production at lower cost, at the same time eliminating or minimizing the risks involved through loss of memory or "ad libbing" by the performer. News commentators, panelists, speakers, and the like, who frequently must appear before the camera "cold," or with little time to prepare, are particularly prone to errors, hesitancy, or forgotten lines. This is also true of announcers who must be letter perfect, particularly in reading commercials since if an error occurs it may be fatal to the effectiveness of the advertising.

In order to solve the problems referred to above, various expedients have been resorted to, among which is included placing the script on cards positioned in the vicinity of the camera so that the performer can read the material at one side or above or below the camera lens. In some cases this material has been placed on a movable strip of paper positioned adjacent the camera, with the movement being controlled by remote control. Disadvantages of such methods are obvious since no matter how closely adjacent the camera the material may be placed, the angle of viewing the material becomes obvious, and there is also the possibility that the eye movements of the performer can be detected by the audience.

The psychological value of prompting equipment has been recognized since even accomplished speakers and actors are given a feeling of confidence by the availability of script material, even if its use should not become necessary.

It is an object of the present invention to provide apparatus for prompting which will overcome the above-mentioned problems by directing the script material and the like into the line of vision of the performer while enabling him to look directly into the lens and at the same time permitting the lens to directly view the performer.

It is a further object of the present invention to provide a simple, compact yet efficient apparatus for attachment to a camera which will project prompting information into the direct line of vision of the subject, such material being interposed in the direct line of view between the lens and the subject.

It is a further object of the present invention to provide an apparatus for projecting prompting material into the line of vision between subject and a camera lens without interfering with the observation of the subject by the lens, and in addition, to permit simultaneous transmission of cues and other instructions to the subject.

It is a still further object of the present invention to provide such apparatus for the transmission of prompting material to a subject being viewed through one or more cameras, such material being continuously transmitted at a predetermined rate and in accordance with a predetermined time schedule with control through a central synchronized monitored control system.

It is an additional object of the present invention to provide apparatus for masking a camera lens from the view of the subject while permitting the lens to view the subject and simultaneously projecting prompting material to the masking means and into the line of view of the subject without interfering with the view of the lens.

It is another object of the present invention to provide a combined camera lens and prompting arrangement in which the member upon which prompting material appears is associated directly with such lens.

It is yet another object of the present invention to provide for mounting of such a prompting device in combination with a camera, which combination can be readily assembled and disassembled and which will permit the camera to be utilized in a normal manner.

This invention possesses many additional advantages and has other objects which are more clearly apparent from a consideration of the forms of the invention illustrated in the drawings and the appended disclosure.

In my copending application, Serial No. 346,987, filed April 6, 1953, entitled Prompting Apparatus for Cameras, of which the present application is a continuation-in-part, I have disclosed and claimed a prompting apparatus which in its general aspects contemplates an apparatus which will enable a person to look directly into the lens or aperture of a camera, and, while looking in such direction, be supplied with words or other intelligence to be spoken or followed by him. The particular material viewed by the person is not seen by the camera. A transparent member is placed between the camera and the person, disposed at an oblique angle to the direction in which the person is looking, along the axis of the lens or aperture. Since this member is transparent, the picture of the person or subject, as viewed by the camera, is unobstructed. However, since the transparent member is disposed at a reflective angle to the person, the material to be transmitted may be projected on such member at an angle which reflects this material to the eyes of the subject. In other words, the material will appear as a virtual image behind the surface of the transparent member in much the same manner as if they were being viewed in an ordinary mirror. On the other hand, the material is not transmitted into the lens of the camera but the image of the subject is transmitted to and through the transparent member into the camera lens. The aforesaid copending application further describes arrangements for accomplishing the desired results in which a card or other object bearing the printed or written material to be projected is illuminated and positioned in a vertical plane parallel to the axis of the camera lens and reflected from the inclined transparent member to the eyes of the subject, or in the alternative the illuminated material is positioned at right angles to the axis of the lens and reflected from a first angularly disposed mirror into the transparent member. These arrangements are incorporated into a housing designed to be attached to the camera and positioned with the transparent reflective member interposed between the lens aperture and the subject.

In applicant's modified construction as described herein a number of additional features, variations and adaptations are utilized incorporating the essential features of the aforesaid application. The overall assembly is designed for simple, compact and effective mounting on a camera, and in a preferred form eliminates or minimizes unbalancing of the camera by the arrangement of its parts and manner of mounting and permits normal operation of the camera without being unwieldy. An effective system of projection is provided and the material to be projected is applied, positioned and handled in a novel manner. Efficient means for control from a master control unit are described, with provision for monitoring and synchronized operation of multiple units. Means are also provided for signalling instructions to the subject simultaneously with projection of the material in a simple and effective manner. In addition, the material projected is in a form which is highly legible without being bulky and difficult to handle and is subject to effective and instantaneous control either from the control room or by the subject himself. Methods for presenting prompting material by the use of the principles described above are also disclosed herein.

The invention will now be more fully described in connection with the accompanying drawings, in which.

Figures 1, 2:
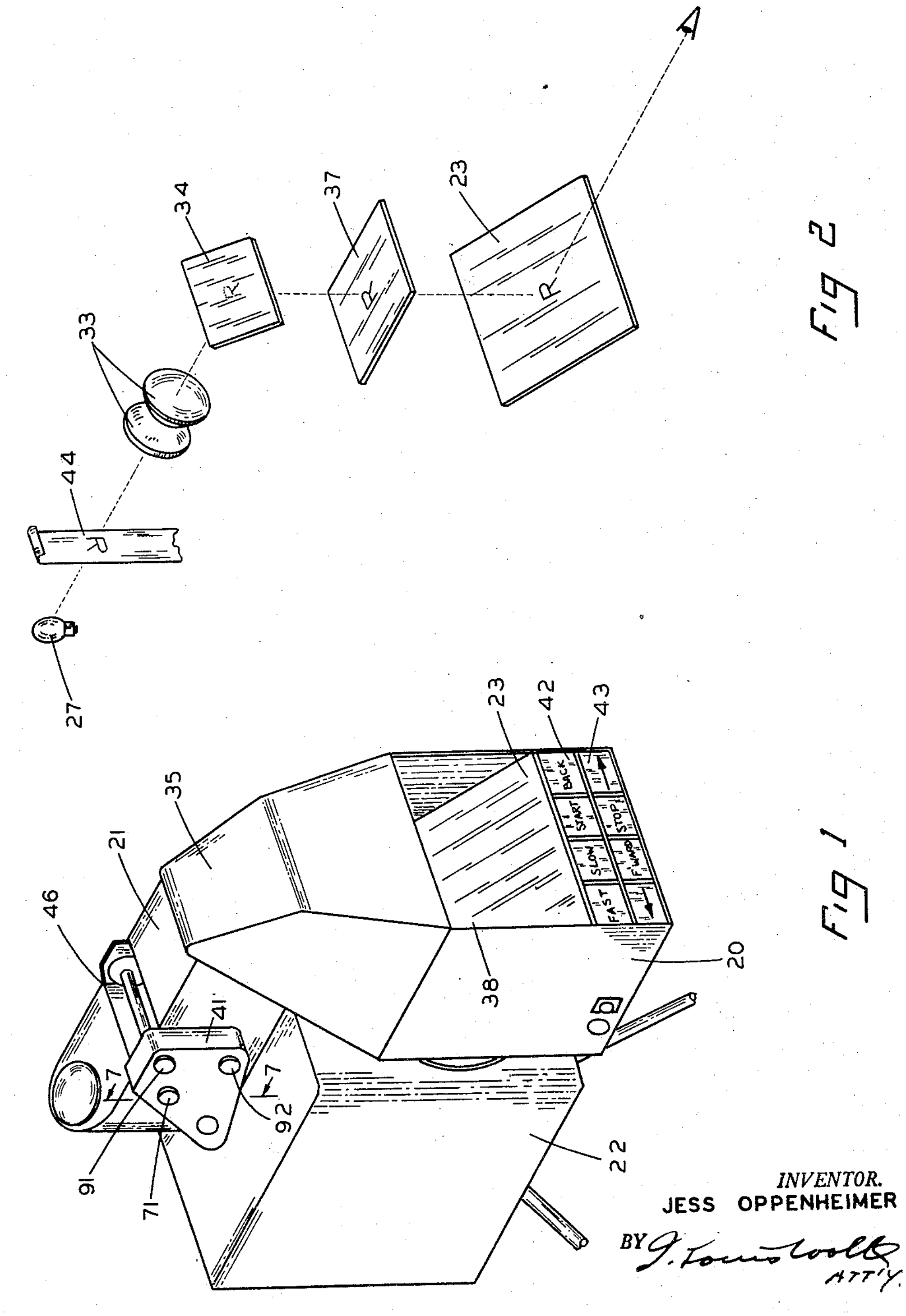
Figure 1 is a plan view in perspective of the prompting apparatus of the invention mounted upon a television camera showing front and side views of the assembly.
Figure 2 is a view taken along a vertical plane through Figure 1, illustrating the path of projection of an image of prompting material transmitted to a subject.
Figure 3:
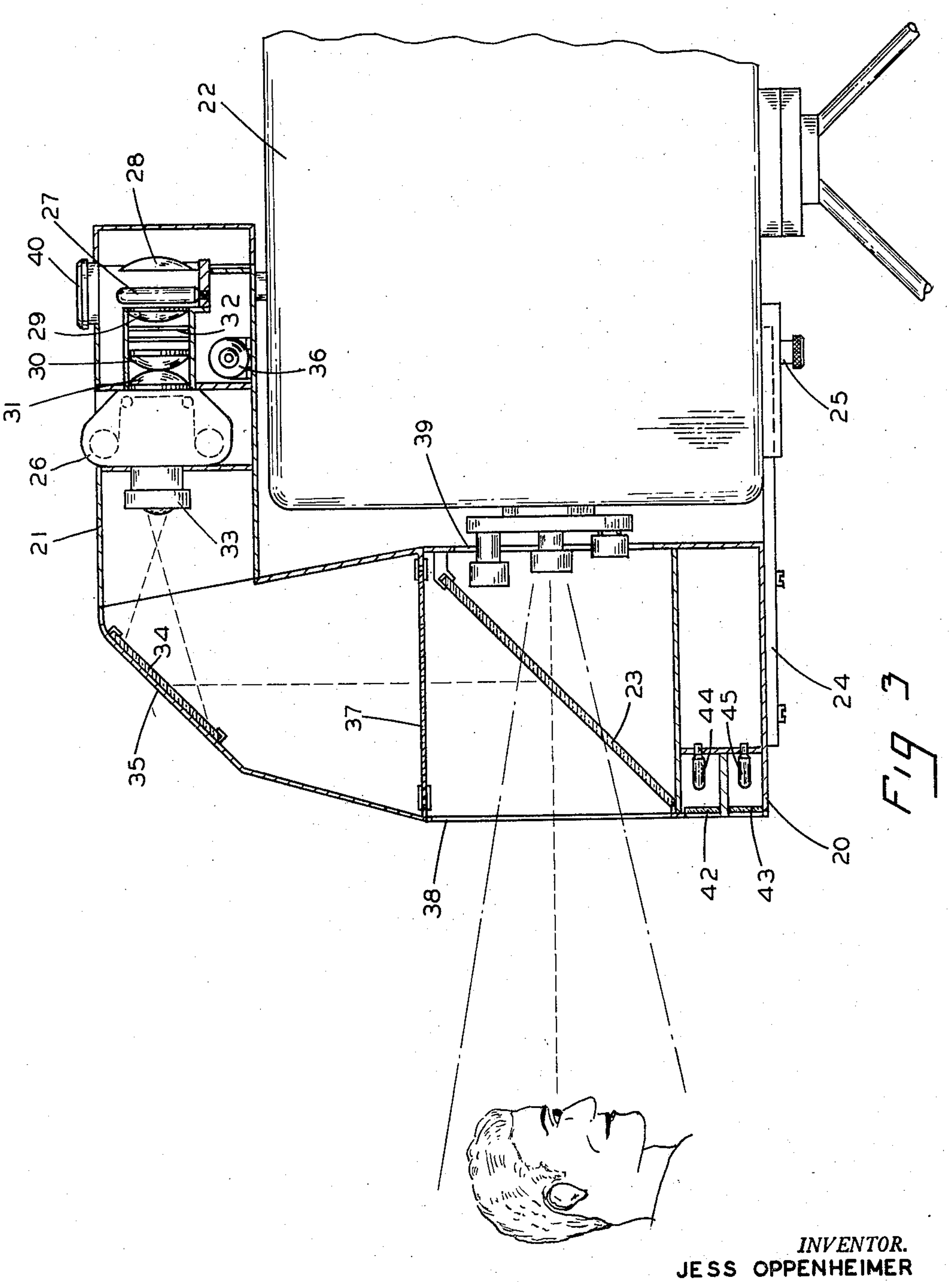
Figure 3 is a vertical cross-sectional view taken through Figure 1.
Figures 4, 6:
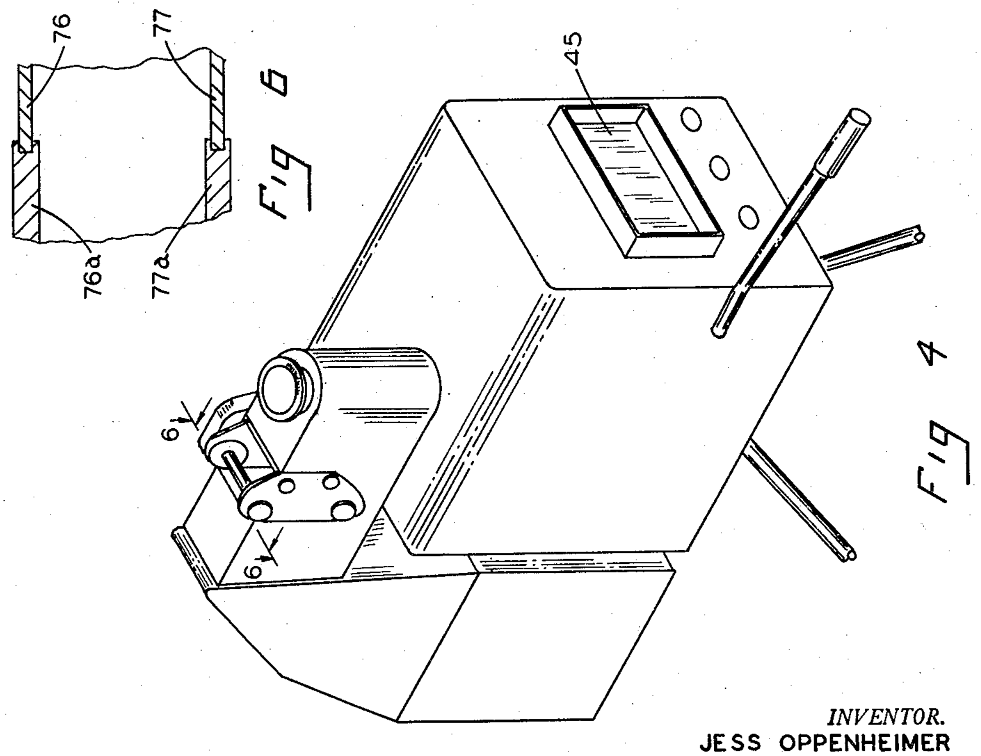
Figure 4 is a plan view in perspective similar to Figure 1, but showing the other side and rear of the assembly.
Figure 6 is a partial horizontal cross-sectional view taken along lines 6—6 of Figure 4, illustrating the slot arrangement for slidably positioning a film cartridge.

In the drawings Figure 1 illustrates the prompting device of the invention mounted upon a television camera, although, of course, the device may be mounted upon a movie camera or any other type of camera equipment. The structure and manner of mounting of the device is described in greater detail in Figure 3, while Figure 4 illustrates the side and rear view of the assembly of Figure 1. Figure 2 is a skeletonized view illustrating the manner in which the device functions. As shown in Figures 1, 3 and 4, the prompting mechanism is contained in a two-part housing consisting of members 20 and 21, attached to and supported upon camera 22. The prompting information is projected onto the inclined surface of transparent reflective member 23, which functions as the viewing screen. As shown in detail in Figure 3, the prompting assembly as contained in vertical enclosure 20 and its attached horizontal enclosure 21, is attached to a supporting plate 24 which is in turn attached to camera 22. This plate may be permanently affixed or may be detachable by means of a convention thumbscrew arrangement as at 25. The script or prompting information is placed on transparent or translucent film material which is wound on a spool which is incorporated in a removable cartridge member 26, and which will be described in greater detail below. The material is projected by an optical unit which includes a lamp and lens assembly, utilizing lamp 27, reflector 28, transmitting light through a condensing lens system of suitable type, for example, with lenses 29, 30 and 31 and heat absorbing filters 32. The light passes through film (shown in dotted lines) being unwound in the film cartridge and the image of the material, which may, for example, be opaque, is projected through a projection lens system contained in member 33 onto the surface of an inclined mirror 34 supported on the interior of or inclined upper portion 35 of housing 20. The material is enlarged to the desired extent in the projection lens unit. As will be further described below, the film unwound from one spool and onto another by means of a chain and sprocket assembly through motor 36. The script material is projected from mirror 34 downward to a ground glass or other translucent or semi-transparent screen 37. The material is then reflected from the underside of the screen by transparent mirror 23 to the subject or performer. An opening 38 is provided in the front of the housing, framing the transparent mirror and forming the viewing opening. Another opening 39 is provided at the back of the housing into which, or opposite which the turret lens assembly of camera 22 will be positioned. The film cartridge is slidably mounted in housing 21 so that it may be slipped quickly and easily into slot 46 formed in the walls of the housing. In this way a new or replacement cartridge is readily replaced. A cap member 40 is provided at the top of the lamp section of the housing to permit easy replacement of a burnt-out lamp.

The driving mechanism of the film is contained in side housing 41 as shown in Figure 1, although the motor is positioned within the main housing as shown in Figure 3.

On the front face of the assembly below opening 38 are positioned groups of windows as illustrated in rows 42 and 43. These windows contain instructions which are projected by illumination behind the windows by means of individually controlled lamps 44 and 45, with a separate lamp being positioned behind each window. A typical set of instructions is exemplified in Figure 1. These instructions are transmitted as desired concurrently or simultaneously with the transmission of the script material contained on the moving film by push button or other means as described further below.

The manner in which the material is transmitted is clearly illustrated in Figure 2, in which the path of transmission is in the same plane as the arrangement illustrated in Figure 1. The script material is typed, lettered, printed or drawn upon the surface of a film or sheet represented by 44. This film is of transparent, semi-transparent, or translucent material in order to permit the transmission of sufficient light to define the letters or other information on the film. It has been found preferable to type or write the material on a transparent plastic film in opaque letters or the like, since the contrast and clarity of reflection in the transparent reflecting member is superior to other expedients. Such film may be composed of cellulose acetate, cellophane, polyvinyl chloride, or other transparent plastic materials. In the apparatus described, 70 millimeter acetate film, perforated along both margins, has been found suitable. The script may be typed directly on the acetate but a more opaque deposit is obtained through a soft carbon paper in contact with the film. When applied in this manner the typing has a tendency to smudge or rub off. This may be eliminated by spraying or coating with a thin film of a quick-drying lacquer. Another expedient is to apply the material through the use of the well-known spirit duplicating process in which the text is typed on a master, and the acetate film then contacted with the master in the presence of alcohol vapors during which operation the ink on the master deposits on the film and is hardened. Still another effective method of obtaining an opaque non-smudging reproduction on the transparent film is through the use of light sensitive emulsion coated film in which a typed master on paper is duplicated by exposing the film to light through the master and then developing by contact with a suitable developer depending on the type of emulsion used. The text may also be applied to the film by writing or typing using a suitable ink which will adhere to the type of film used. Translucent paper may also be used, although this is not as satisfactory as plastic film. An alternative procedure is the use of carbon coated paper or carbon coated plastic film, in which the letters are formed by typing or writing accompanied by the removal of carbon material at the points of contact. The background is thus opaque and the letters are defined by the light shining through the film.

Referring again to Figure 2, the letter R is utilized as an example, formed on transparent film 44. Light from lamp 27 passes through the transparent film and outlines the letter R projecting it through lens system 33. The lens system projects the letter against inclined mirror 34, at the same time inverting and enlarging the letter, which is then reflected onto the top surface of ground glass or other semi-transparent or translucent screen 37. The letter appears on the bottom surface of the screen and is reflected into inclined transparent mirror 23 and thence to the eye of the subject. In the form illustrated, the film is so positioned that the letter is in inverted and reverse position facing the lamp and in inverted position facing the projection lens. The letter is then inverted by the lens system and impinges on the mirror in a right side up but reverse position from which it is reflected in a normal readable position onto the top surface of the screen. The transparent reflecting member sees the bottom of the screen in which the letter is right side up but reversed but this mirror again reverses the image and reflects it in normal position to the eyes of the observer. Of course, if the projecting lens system is of the erecting type, the film would be inserted in the reverse manner. As described in the aforesaid copending application, the transparent mirror may be of glass, either uncoated or coated with a thin film of transparent but reflective material so that the light transmissibility of the member is not seriously affected. Very thin metal films can be deposited in microscopic thickness by vacuum deposition or other methods. This member can be constituted as a thin transparent pellicle mirror which will eliminate double images. In the arrangement shown in Figures 1 to 4, the transparent mirror is positioned at a substantially 45 degree angle with respect to the axis of the camera aperture, while the upper reflecting mirror is positioned parallel and in a reflecting position thereto. The screen is parallel to the axis of the camera aperture and positioned to reflect the image from its bottom surface into the transparent mirror. It has been found that the use of an anti-reflecting optical coating on the backside of the glass will suppress secondary images, while a 60 percent transmitting, 40 percent reflecting coating on the front surface of the glass will give a highly satisfactory reflection of the primary image of the material being transmitted to the subject.

As stated above, Figure 4 illustrates the rear and opposite side of the camera and prompter assembly of Figure 1. The viewing opening for the cameraman is shown at 45 while the other elements have been described in connection with Figures 1 and 2.

In the form of the invention illustrated in Figures 1 to 4 the light projecting portion of the assembly is positioned above the camera and horizontal therewith, with the reflecting portion of the unit being positioned vertically in front of the camera. This arrangement permits a path of substantial length for projection and enlargement of the image, and also provides a unit having a center of gravity somewhat closer to the center of gravity of the camera, than would be the case if the whole unit were mounted forward of the camera. This reduces the amount of counterbalancing required.

Figure 5:
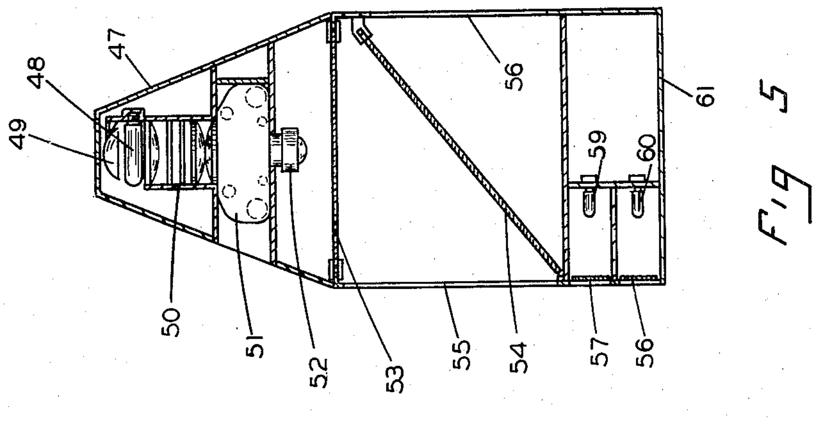
Figure 5 is a vertical cross-sectional view illustrating a modified form of the invention.

Figure 5 illustrates in cross section a modified form of the invention incorporating direct vertical projection positioned in front of the camera. The entire unit is assembled in a vertical enclosure with the projection unit being positioned in upper section 47 containing lamp 48, reflector 49, condensing lens system housed in 50, film cartridge 51, projection and enlarging lens unit 52 and ground glass screen 53. The material on the film is projected against and through the screen with the image being picked up from the bottom surface of the screen and reflected by inclined transparent reflecting member 54. The material transmitted is viewed by the subject looking into opening 55 in the enclosure while the camera lens views the subject through opening 56, and member 54. Instructions may be simultaneously transmitted by illuminating rows of windows 57 and 58 by means of individual lamps 59 and 60. The bottom portion of the housing 61 may be supported on a plate or mounting bracket (not shown) which is in turn attached to the camera.

Figures 7, 8:
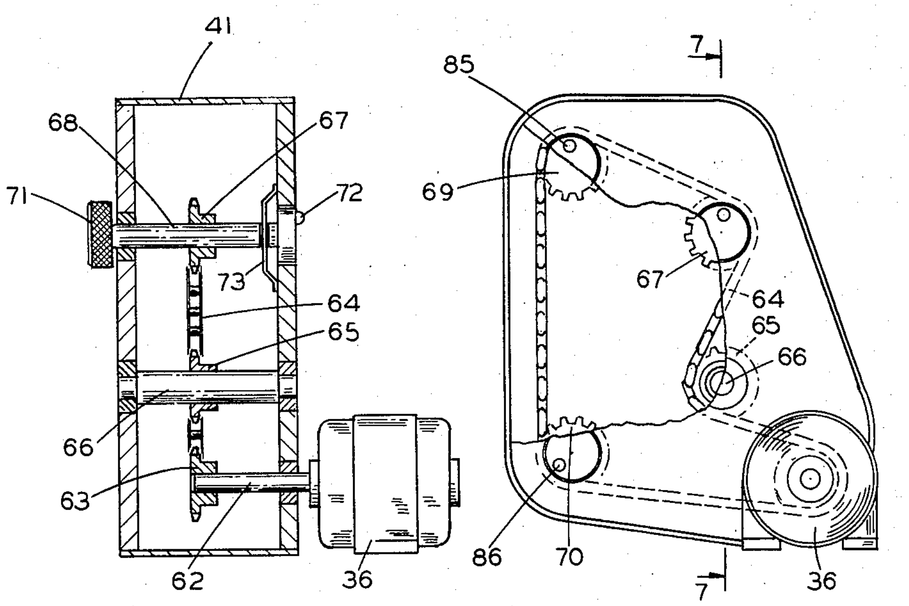
Figure 7 is a vertical cross-sectional view taken along lines 7—7 of Figure 1, illustrating the driving arrangement for the film utilized in the prompting, together with the driving motor therefor.
Figure 8 is a side elevation illustrating the driving mechanism shown in Figure 1, with the side panel partially removed.
Figure 9:
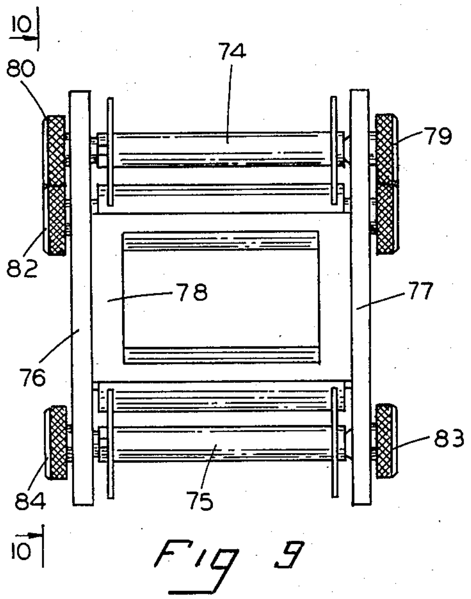
Figure 9 is a front view in elevation of the removable film cartridge utilized in the apparatus.
Figure 10:
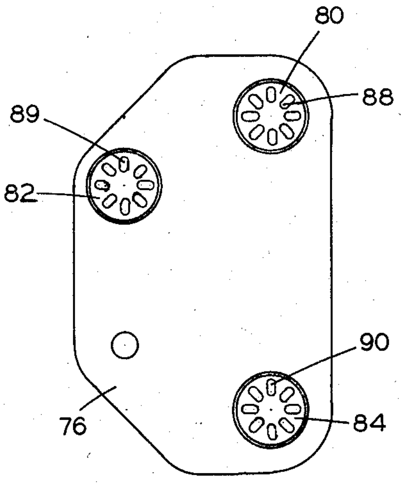
Figure 10 is a side elevation of the film cartridge shown in Figure 8.

The driving mechanism for the film is contained in a housing 41 as shown in Figures 1 and 7. This housing contains a motor shaft 62 driven by motor 36 which is positioned in the projection housing 21 (Figure 3). The shaft bears a drive sprocket 63, engaging driving chain 64, which in turn engages idler sprocket 65 on idler shaft 66 and a driving sprocket 67 positioned on shaft 68. As shown in Figure 8, the chain then engages film spool drive sprockets 69 and 70. The drive is engaged and disengaged by pulling out on knob 71 (see also Figure 1) which draws pin 72 inward against spring 73 as shown in Figure 7 and as described below in connection with Figures 9 and 10. These figures illustrate the film cartridge member which is slidably positioned in the slot designed for this purpose as shown at 46 in Figures 1 and 4. The cartridge includes side plates 76 and 77 between which film spools 74 and 75 are positioned. Across the front of the assembly is a framing plate 78 which supports and frames the film and also braces the structure. 79 and 83 are disengaging knobs which may be spring loaded and which pull outward to release film spools 74 and 75. Knobs 80, 82 and 84 are provided with openings 88, 89 and 90 with openings 89 being engageable by pin 72 of Figure 7 and 88 and 90 being engageable by similar spring loaded pins retractable by knobs 91 and 92 as shown in Figure 1. These pins cooperate with the sprockets and drive chain to operate the winding and rewinding of the film spools.

The film cartridge is preferably designed so that it may be slidably inserted into and removed from its proper position in the projection assembly. One manner of doing this is illustrated in Figure 6, which is a partial cross section showing side panels 76 and 77 of the cartridge positioned in grooves formed in the cut-out portions of side members 76a and 77a in the portion of the enclosure containing the projection unit.

Figure 11:
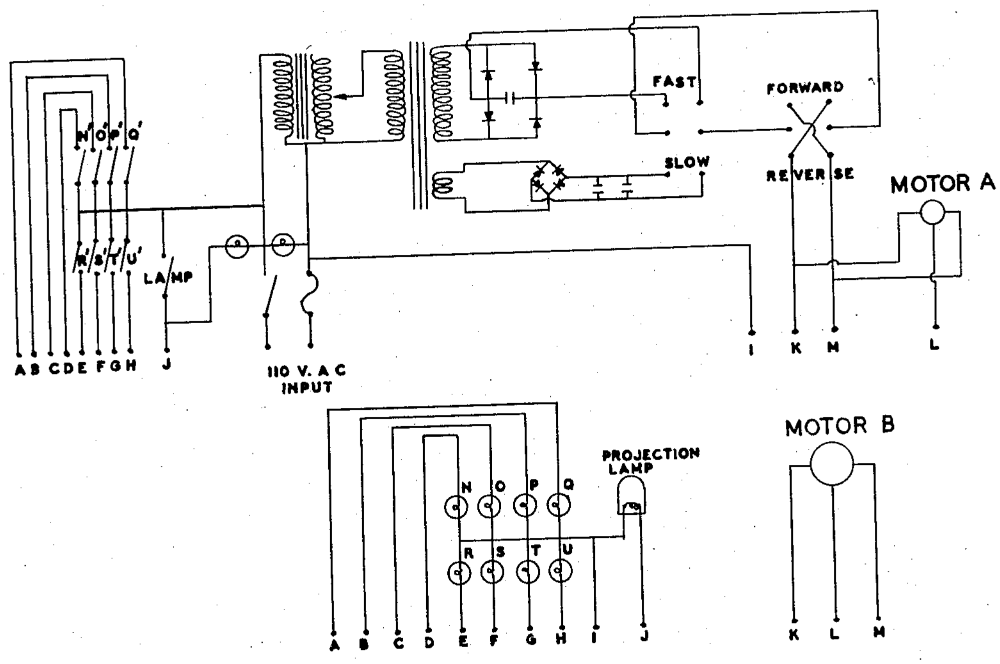
Figure 11 is a wiring diagram illustrating a wiring arrangement for a system corresponding to that illustrated in Figure 12.

Figure 11 illustrates diagrammatically one typical arrangement utilizing three prompting devices connected by cables of desired length through a distribution box to a central monitor and control unit. This control unit has within it a variable speed D.C. motor operated film winding and unwinding device utilizing the original master copy from which the material was reproduced for use in the prompting units. This may preferably be the original typed copy on perforated paper which is so positioned that it is moved past a window on the monitor panel. Since the winding mechanism is operated at the same speed and in synchronism with corresponding member on the three prompters, the program director or producer can follow the script and accelerate or decelerate by the appropriate control. The cue buttons permit the director to flash cue signals to the prompters which are each mounted on separate cameras which are positioned at desired points. Of course, the monitor may incorporate a projection and enlargement system as in the prompters so that the script may be viewed on an enlarged screen. As indicated, the projection lamp may be switched off and on so that the prompter will function as a cuing device rather than projecting the material to the subject continuously even though the film may be fed continuously. In this way the light may be flashed on at any point by performer or director to act as a reminder to the subject and also tell him whether he is speaking too rapidly or too slowly. Provision is made for changing the rate of movement of the film and reversing means are provided for rewinding the film.

Figure 12:
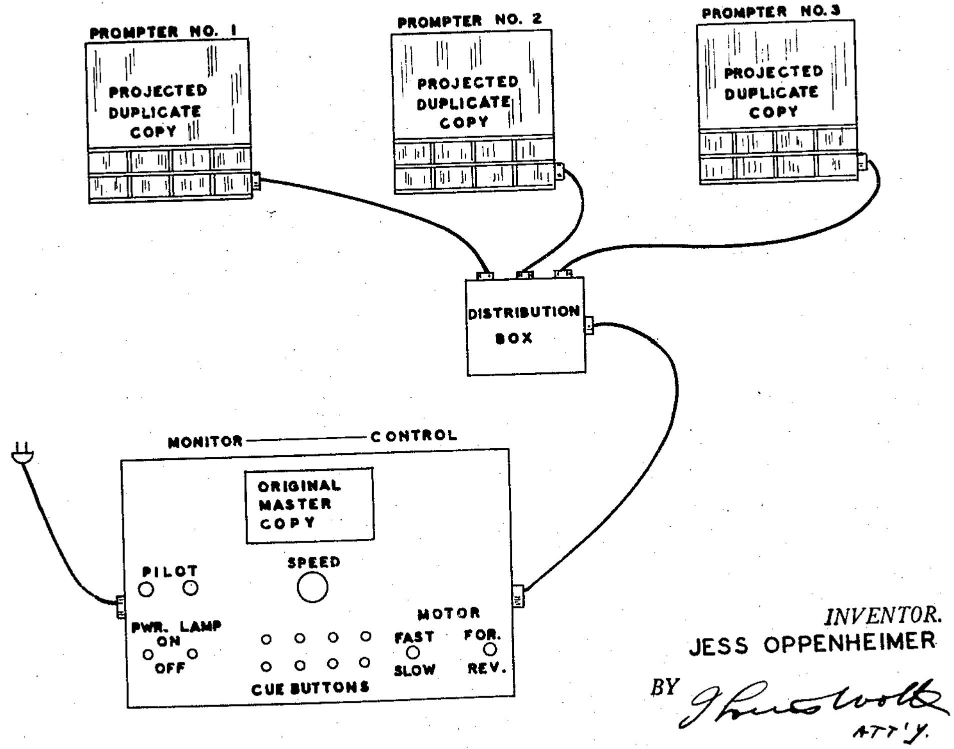
Figure 12 is a schematic layout illustrating the arrangement of a plurality of prompting devices with a control and monitoring center.

A typical wiring diagram for the arrangement illustrated in Figure 11 is shown in Figure 12. The upper segment of this diagram represents the wiring diagram for the monitor control panel while the lower segment represents the wiring diagram for each prompter unit, these units being interconnected by a 13 wire cable. A variable speed D.C. motor A operates to transport the film or master copy in the monitor unit shown in Figure 11. Variable speed D.C. motor B operates the film transport mechanism on the prompter units, each prompter unit having its own motor to drive the film. 110 volt A.C. single phase power is fed into a variable voltage transformer to supply a variable voltage to a fixed transformer. The fixed transformer is provided with two secondaries, one of which supplies a low voltage range and the other a high voltage range, with both ranges being rectified to supply two ranges of D.C. voltage to the motors. This permits fast and slow variable speed ranges controlled through the potentiometer. Both motors are connected to the same power supply lines K, L, and M. The motors for other prompting units would be connected to the same lines in parallel. The motors are reversible through switching means connected to lines K or M as desired. In the circuit shown the motors may be operated forward or reverse in both speed ranges. The cue lamps N to U, inclusive, are individually operated by buttons on the monitor panel, which operate switches N′ to U′, respectively, as shown in Figure 12. The prompter projection lamp J as well as the cue lamps are all connected to A.C. lines I and V.

As one example of the utilization of the method and apparatus described herein, the script or prompting material is first typed upon a roll of paper. This particular equipment is designed to utilize 70 millimeter perforated film and hence the typing is performed on 70 millimeter perforated paper. The typed paper strip is then run through a conventional duplicator along with 70 millimeter cellulose acetate film which is transparent and has been coated with a light sensitive film, the nature of the coating depending on the type of duplicating process used. A duplicate roll on transparent film is thus obtained. This roll is then placed on the film cartridge described above and the cartridge is inserted into the housing of the prompter unit in position for the light to be projected through the film as illustrated in Figure 2. The prompting unit has, of course, been positioned in front of the camera lens and mounted on the supporting plate. The rear opening of the enclosure is so designed that the turret lens assembly on the camera may function in a normal manner by rotation of the desired lens into position. The master paper roll is then placed in a suitable film winding and unwinding device and positioned behind the monitor panel illustrated in Figure 10 so that the material will be visible to the operator of the equipment. A film cartridge and winding device similar to that illustrated in Figures 7 to 10 is satisfactory. The film winding mechanism in the monitor panel and in the prompter are operated by variable speed D.C. motors in a circuit as described in Figure 12. The speed of the film winding mechanism has previously been calibrated so that the operator can properly time and regulate his controls. When the television program, or the filming is ready to start, the projection lamp is lit and the movement of the film in the prompter and the master on the monitor panel is commenced. The performer is signaled to start by the operator who presses the start button on his panel. This causes the light behind the "start" signal window to flash and thus notify the performer. The material in the prompting unit is projected into the eyes of the subject while he is being viewed by the camera lens so that he can read his lines while looking directly into the camera lens. The motor on the prompter and the motor on the monitor are designed and wired to operate at the same speed so that the operator can continuously follow the script and alert the performer if he is going too slow or too fast by pressing the appropriate buttons. Furthermore, the scrip movement can be speeded up or slowed down by means of the speed control. If the performer is to look toward another camera he can be signaled to do so by flashing the lamp behind one of the arrows on the cue window on the prompter. If the performer is to step back or move closer, this also can be signaled to him in the same manner. It is apparent that these or other cues or instructions can be transmitted to the performer instantaneously and in a manner which will not interrupt or distract him. At the end of the film it is rewound by reversing the driving motor, or if desired, can be removed for later rewinding, and a fresh roll of film inserted. This arrangement is also of value for rehearsals since the script can be reversed and repeated at any desired point.

Frequently, the performer may not wish to see the script material if it has been committed to memory, but prefers to utilize the prompter on a "standby basis" to provide him with confidence in the knowledge that it can be instantaneously projected in the event he requires its use. In such event, the mechanism can be placed in operation with the projection lamp unlit, with the operator following the script on the monitor and being prepared to illuminate the projection system as a prompting means if necessary. The performer may, if desired, be provided with a speed control switch and power and lamp controls by means of buttons or switches on a small panel so that he can control his own prompter unit, either in place of, or in addition to the operator or director in the control room.

Although a variable speed D.C. motor system has been described, servomechanisms of various types can also be used. The conventional selsyn system utilizing a master and slave units is highly satisfactory to achieve synchronized operation of one or more prompting units with a master monitor control.

I claim:

1. Apparatus for transmitting information to a person simultaneously while such person is being viewed by a camera having an aperture and a lens system, comprising an enclosure having front and rear openings in horizontal alignment with each other adapted to be positioned in front of said camera with said openings in alignment with the camera aperture, a transparent reflecting member positioned in said enclosure between said openings and thereby on the axis of said aperture when the enclosure is so positioned, said reflecting member being inclined away from said camera lens at an angle of about 45 degrees and being positioned transversely of the axis of the aperture, a translucent screen member in said enclosure positioned above said reflecting member substantially parallel to the axis of the aperture, a reflective mirror positioned in said enclosure above said screen member and mounted parallel to said transparent reflective member, a horizontal extension of said enclosure extending at a substantially right angle thereto in line with said reflecting mirror and above and parallel to the top of the camera, light projection means positioned in said extension directing light through a projection lens system positioned between said light projection means and said mirror at an incident angle to said mirror, a replaceable film cartridge bearing a strip of light transmitting film having information placed thereon positioned between said light projection means and said projection lens system, and a remotely controlled variable speed motor for transporting said film to progressively project said information against the reflecting mirror and thence to said translucent screen member and onto the surface of said transparent reflecting member whereby said information is thereby reflected to the person along the axis of the camera aperture.

2. Apparatus according to claim 1 wherein the remotely controlled film transport motor is synchronized with and controlled by a variable speed motor which simultaneously controls the transport of duplicate information associated with monitor control means.

3. Apparatus according to claim 1 comprising a plurality of such enclosures, each having a variable speed film transport motor, light projection means, projecting lens system, reflecting mirror, translucent screen and an inclined transparent member; a monitor control means having a variable speed motor controlling the transport of duplicate information, and means interconnecting said film transport motors and monitor motor whereby each film transport motor is operable at the same rate of speed and in synchronism with the motor in said monitor control means.

4. Apparatus according to claim 3 wherein a plurality of individually controlled signals are associated with the front portion of each enclosure visible to the person, each of said signals being controlled by switch means associated with said monitor control means.

5. Apparatus for transmitting information to a person while such person is being viewed by a camera having an aperture and a lens system, comprising an enclosure having front and rear openings in horizontal alignment with each other adapted to be positioned in front of said camera with said openings in alignment with the camera aperture, a transparent reflecting member positioned in said enclosure between said openings and thereby on the axis when the enclosure is so positioned, said reflecting member being inclined away from said camera lens at an angle of about 45 degrees and being positioned transversely of the axis of the aperture, a translucent screen member in said enclosure positioned above said reflecting member substantially parallel to the axis of the aperture, a reflective mirror positioned in said enclosure above said screen member and mounted parallel to said transparent reflective member, a horizontal extension of said enclosure extending at a substantially right angle thereto in line with said reflecting mirror and above and parallel to the top of the camera, light projection means positioned in said extension directly light through a projection lens system positioned between said light projection means and said mirror at an incident angle to said mirror, a replaceable strip of light transmitting film having information thereon positioned between said light projection means and said projection lens system, and a remotely controlled motor for transporting said film to progressively project said information against the reflecting mirror and thence to said translucent screen member and onto the surface of said transparent reflecting member whereby said information is reflected to said person along the axis of the camera aperture.

6. The combination according to claim 5, wherein said horizontal extension is arranged and adapted to locate the center of gravity of said apparatus at least approximately at the center of gravity of said camera.

7. Apparatus for transmitting information to a person while such person is being viewed by a camera having an aperture and a lens system, comprising an enclosure having front and rear openings in horizontal alignment with each other adapted to be positioned in front of said camera with said openings in alignment with the camera aperture, a transparent reflecting member positioned in said enclosure between said openings and thereby on the axis when the enclosure is so positioned, said reflecting member being inclined away from said camera lens at an angle of about 45 degrees and being positioned transversely of the axis of the aperture, a translucent screen member in said enclosure positioned above said reflecting member substantially parallel to the axis of the aperture, a reflective mirror positioned in said enclosure above said screen member and mounted parallel to said transparent reflective member, a horizontal extension of said enclosure extending at a substantially right angle thereto in line with said reflecting mirror and above and parallel to the top of the camera, means for projecting an information bearing image at an incident angle to said mirror, said last means located within said horizontal extension of said enclosure and arranged to project said information against said reflecting mirror and thence to said translucent screen member and onto the surface of said mirror, and a remotely controlled device for modifying the content of said projected information at a controllable rate.

8. The combination according to claim 7, wherein said horizontal extension is arranged and adapted to locate the center of gravity of said apparatus at least approximately at the center of gravity of said camera.

References Cited in the file of this patent

UNITED STATES PATENTS

| | | |
|---|---|---|
| 1,372,675 | Davis | Mar. 29, 1921 |
| 1,636,834 | Peters et al. | July 26, 1927 |
| 1,935,572 | Leventhal | Nov. 14, 1933 |
| 1,985,253 | Hopkins | Dec. 25, 1934 |
| 2,279,084 | Tillyer | Apr. 7, 1942 |
| 2,291,931 | Troeger | Aug. 4, 1942 |
| 2,420,198 | Rosenthal | May 6, 1947 |
| 2,484,379 | Goldberg | Oct. 11, 1949 |
| 2,598,947 | Thielen | June 3, 1952 |
| 2,696,753 | Segal et al. | Dec. 14, 1954 |
| 2,711,667 | Simjian | June 28, 1955 |